US012665941B2

(12) United States Patent
Springer

(10) Patent No.: US 12,665,941 B2
(45) Date of Patent: ***Jun. 23, 2026

(54) SHARING DATA DURING A CONFERENCE

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 18/500,594

(22) Filed: Nov. 2, 2023

(65) Prior Publication Data

US 2024/0064187 A1      Feb. 22, 2024

Related U.S. Application Data

(63) Continuation of application No. 17/555,810, filed on Dec. 20, 2021, now Pat. No. 11,848,975.

(51) Int. Cl.
H04L 65/75 (2022.01)
H04L 65/403 (2022.01)

(52) U.S. Cl.
CPC .......... H04L 65/762 (2022.05); H04L 65/403 (2013.01)

(58) Field of Classification Search
CPC . H04L 65/762; H04L 65/403; H04L 65/1089; H04L 65/4015
See application file for complete search history.

(56) References Cited

U.S. PATENT DOCUMENTS

| | | | |
|---|---|---|---|
| 9,485,467 B2 | 11/2016 | Kunigita et al. | |
| 2009/0291674 A1* | 11/2009 | Choi ...................... H04H 20/38 | |
| | | | 455/414.3 |
| 2013/0132862 A1 | 5/2013 | Noel et al. | |
| 2013/0159414 A1 | 6/2013 | Zhou | |
| 2014/0365919 A1 | 12/2014 | Shaw et al. | |
| 2015/0058397 A1 | 2/2015 | Kanaya | |
| 2015/0128175 A1 | 5/2015 | Eklund et al. | |
| 2016/0154471 A1 | 6/2016 | Smith et al. | |
| 2017/0063716 A1 | 3/2017 | Marjou et al. | |

(Continued)

FOREIGN PATENT DOCUMENTS

| | | |
|---|---|---|
| EP | 2454680 A1 | 5/2012 |
| JP | 2022085410 A | 6/2022 |

OTHER PUBLICATIONS

GoToWebinar, How do I share a video during a webinar? https://support.goto.com/webinar/help/share-a-video-beta-g2w090120., Nov. 5, 2021, 4 pages.

(Continued)

*Primary Examiner* — Phung-Hoang J Nguyen
(74) *Attorney, Agent, or Firm* — Young Basile Hanlon & MacFarlane, P.C.

(57) ABSTRACT

A presenter device connected to a conference provides shared data to one or more destination devices connected to the conference. The presenter device receives a representation of a download progress of the shared data at the one or more destination devices. The presenter device prompts a user of the presenter device to select a presentation time of the shared data in conjunction with causing display, at the presenter device, of the download progress.

20 Claims, 11 Drawing Sheets

(56) References Cited

U.S. PATENT DOCUMENTS

| | | | |
|---|---|---|---|
| 2018/0070049 A1 | 3/2018 | Pinheiro e Mota | |
| 2019/0268959 A1* | 8/2019 | Urushihara | G06F 13/00 |
| 2020/0296145 A1* | 9/2020 | Horiuchi | H04L 65/4015 |
| 2021/0250195 A1 | 8/2021 | Baker | |
| 2022/0353338 A1 | 11/2022 | Bhide et al. | |

OTHER PUBLICATIONS

Kaltura, Can I preload filed into a breakout room? https://knowledge.kaltura.com/help/can-i-preload-files-into-a-brekout-room?, Jan. 12, 2021, 3 pages.
Microsoft, Preload attachments for a Skype for Business meeting, https://support.microsoft.com/en-us/office/preload-attachments-for-a-skype-for-business-meeting-fd3d9f9d-b448-4754-b813-02e49393f251., Nov. 2021, 6 pages.
International Search Report and Written Opinion mailed on Apr. 18, 2023 in corresponding PCT Application No. PCT/US2022/052555.

* cited by examiner

902

900

ABC-VIDEO.MP4

DOWNLOAD STATUS

904

906

23% OF VIEWERS
HAVE DOWNLOADED

908

WAIT 97 SECONDS FOR
80% OF VIEWERS TO
HAVE DOWNLOADED

910

COMPLETED
DOWNLOAD

PENDING
DOWNLOAD

912

JACK ABC
JANE DEF

EMILY GHI
CINDY JKL

:

:

1000

1002

PROVIDE SHARED DATA FROM A SOURCE DEVICE TO
DESTINATION DEVICES

1004

RECEIVE A REPRESENTATION OF A DOWNLOAD PROGRESS

1006

PROMPT A USER TO SELECT A PRESENTATION TIME BASED ON
THE DOWNLOAD PROGRESS

1100

1102
RECEIVE A REQUEST TO DOWNLOAD
SHARED DATA

1104
INITIATE DOWNLOADING OF THE SHARED
DATA

1106
RECEIVE AN INDICATION THAT THE SHARED
DATA IS BEING PRESENTED

1108
DOES
THE DOWNLOADING OF
THE SHARED DATA MEET
PREDETERMINED
REQUIREMENTS?

YES                    NO

1110
PLAY FROM
MEMORY

1112
STREAM VIA
CONFERENCE

SHARING DATA DURING A CONFERENCE

CROSS-REFERENCE TO RELATED APPLICATION(S)

This application is a continuation of U.S. patent application Ser. No. 17/555,810, filed Dec. 20, 2021, the entire disclosure of which is hereby incorporated by reference.

FIELD

This disclosure relates to audio or video conferencing via a computer network, and, specifically, to sharing data for presentation during a conference or receiving shared data for presentation during the conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
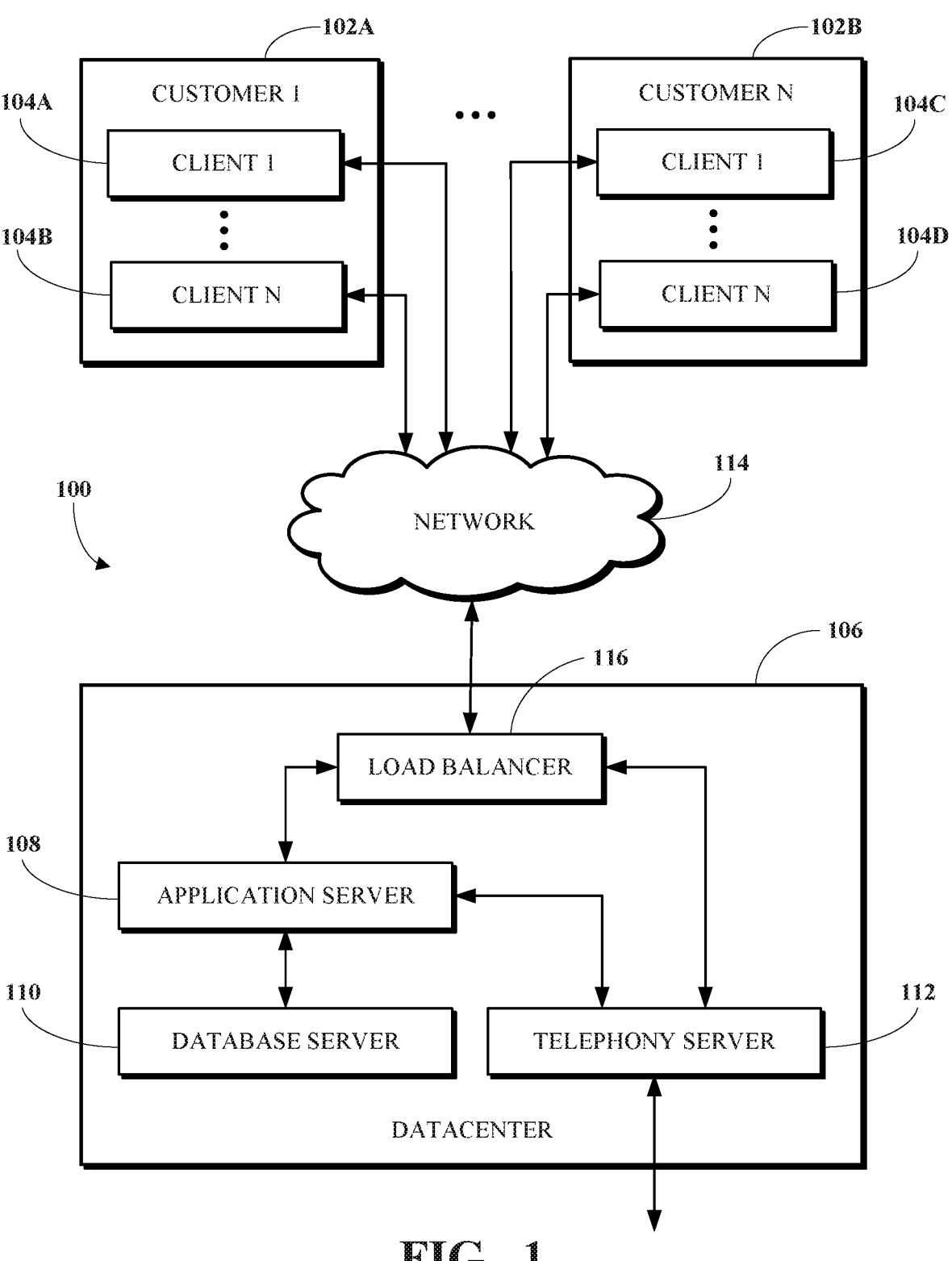
FIG. 1 is a block diagram of an example of an electronic computing and communications system.

A presenter in an online conference (e.g., a video conference) may share media, such as a video, during the conference. The presenter may have options for how to present the media. In one example, the presenter may present the media via screensharing from a source device. While screensharing enables the media to be quickly shared, the media presented via a screenshare is often reduced in quality to accommodate bandwidth and network conditions available to destination devices with which the media is shared. The quality of the media may, for example, be reduced due to down-sampling of the media at the source device or transmission latency between the source device and the destination device. In another example, the presenter may instruct other participants in the conference to download and locally view the media themselves. While this helps to ensure the media is presented in its original, intended format and quality, this may disrupt the conference based on the time it takes for participants to download the media. Furthermore, this approach may result in an asynchronous viewing experience, where the users of the destination devices at which the media is downloaded view the media at different times from one another as the users may press play at different times.

In an example illustrating this problem, a speaker in a conference about knitting might prepare a video of a professional knitting a quilt and might wish to present a high-quality version of that video in a conference with tens or hundreds of participants. The speaker might wish to pause the video at different times during playback to discuss the knitting techniques being used. For example, the speaker might want to pause the video at a specific frame to discuss the knitting techniques shown in that frame. This would not be possible with asynchronous playback. The speaker may playback the video from his/her own device during the conference, and have the video streamed to the participants' devices. However, this might result in the participants viewing a lower-quality version of the video due to down-sampling at the speaker's device or transmission issues. Alternatively, the speaker may instruct the participants to download the video and play it themselves during the meeting. However, in this case, it might be difficult to get all of the participants' devices to pause the playback at the specific frame that the speaker wishes to discuss.

Implementations of this disclosure address problems such as these by providing techniques for sharing data or receiving shared data for presentation during a conference. A source device that participates in a conference (or plans to participate or provide data for sharing in a future conference) shares data (e.g., one or more media files) with destination devices in the conference via a server. The destination devices begin downloading the shared data from the server. When the user of a presenter device (which may be the source device or one of the destination devices) decides to play the shared data, the shared data may be played from local memory at the destination devices that have downloaded the shared data. This results in a high-quality and synchronized viewing experience among the destination devices, as the destination devices playback the shared data from local memory and the playback is controlled by the presenter device.

The source device transmits (e.g., before the conference begins or at the beginning of the conference) shared data (e.g., one or more media files) to be shared during the conference. The shared data is stored at a server. The destination devices in the conference download the shared data from the server and transmit their download progress to the server. The server monitors the download progress data of the destination devices. Based on the monitored download progress data, the server generates a representation of the download progress at the destination devices (e.g., a percentage of the destination devices that finished downloading or an indication of whether specified destination devices have downloaded more than 85% of the shared data) and transmits the representation of the download progress to a presenter device. The presenter device is responsible for controlling the presentation of the shared data. The presenter device may belong to one of the hosts or one of the speakers in the conference.

The source device displays, to a user, information from the transmitted representation of the download progress. For example, the presenter device may display the percentage of destination devices that have fully downloaded the shared data. Alternatively, the presenter device may display a color-coded block indicating that percentage (e.g., red when less than 60%, yellow when between 60% and 90%, and green when more than 90%). In the color-coded example, the presenter device may also display an estimated time (e.g., at 4:23 pm or in 90 seconds) when the color-coded block will turn green. The estimated time may be computed based on download speeds at the destination devices. Based on the displayed representation of the download progress, the user of the presenter device selects a presentation time as a time at which to present the shared data to the destination devices. For example, the user may wait until 90% of the destination devices have downloaded the shared data or until specific destination devices (e.g., identified by account or user identifier) have downloaded at least 80% of the shared data. If the color-coded indicator is used, the user may wait until the color-coded indicator turns green.

At the selected presentation time, the presenter device transmits a signal notifying the destination devices that the shared data is to be presented. In response to the signal from the presenter device, each of the destination devices which has been downloading the shared data determines whether the shared data is fully downloaded to local memory at the viewer device or whether the shared data is downloading at a sufficient speed for uninterrupted playback. As used herein, the shared data is downloading at the sufficient speed for uninterrupted playback if some or all parts (e.g., some or all frames for video data) of the shared data are expected to have been downloaded before it is to be provided as output at the destination device (e.g., displayed or provided as audio output). For example, this may happen if the download speed exceeds the playback speed or if a beginning portion (e.g., the first n frames, where n is a positive integer) of the shared data has already been downloaded and the remaining portion is expected to have been downloaded before the playback is expected to be completed. If the shared data is fully downloaded to local memory, the destination device plays the shared data from local memory in response to the signal from the presenter device. Otherwise, the destination device streams the shared data from the presenter device (or, alternatively, from the server or the source device). If the destination device streams the shared data from the presenter device, the presenter device may, for example, play the shared data while implementing screen-sharing and audio sharing with the destination device. The data downloaded to local memory may be of higher quality (e.g., higher resolution video or images) than the data streamed from the presenter device, allowing the user of a destination device at which the shared media is available in local memory to enjoy a higher quality playback experience during the presentation than the user of a destination device which streams the shared data.

Furthermore, destination devices that are unable to download the shared data (e.g., destination devices with poor network connections or destination devices calling into the conference via a telephone number) may stream the shared data from the presenter device. For example, in some cases a threshold check for network conditions may be made at the destination device before the destination device begins downloading. In such a case, the destination device may only begin downloading the shared data where the network conditions satisfy the threshold check.

Some implementations are described herein as relating to downloading data that is shared during a conference. However, the techniques disclosed herein may be used in other contexts and are not limited to use cases in the conferencing space. In some implementations, artificial intelligence (e.g., an artificial neural network or a generative adversarial network) may be used to predict media that a user might want to access in the future based on text messages, email messages, social network posts, calendar events, and the like. For example, Albert sends a message to Betsy, "Let's watch ABC-Movie during our flight this afternoon." In response, Albert's or Betsy's computing device might, after prompting the user and receiving the user's affirmative consent, automatically download ABC-Movie from a movie server when the computing device meets certain conditions, such as at least one of: being plugged in, being at least 50% charged, being idle, and being connected to a high-speed network. A computing device identifies a file for future use using artificial intelligence techniques and based on a communication record stored at the computing device. The computing device generates a graphical user interface (GUI) prompting a user to verify that he/she wishes to download the identified file. The computing device receives a user verification via the GUI. The computing device downloads the identified file in response to the user verification and the computing device meeting a predefined condition.

To describe some implementations in greater detail, reference is first made to examples of hardware and software structures used to implement sharing data for presentation during a conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
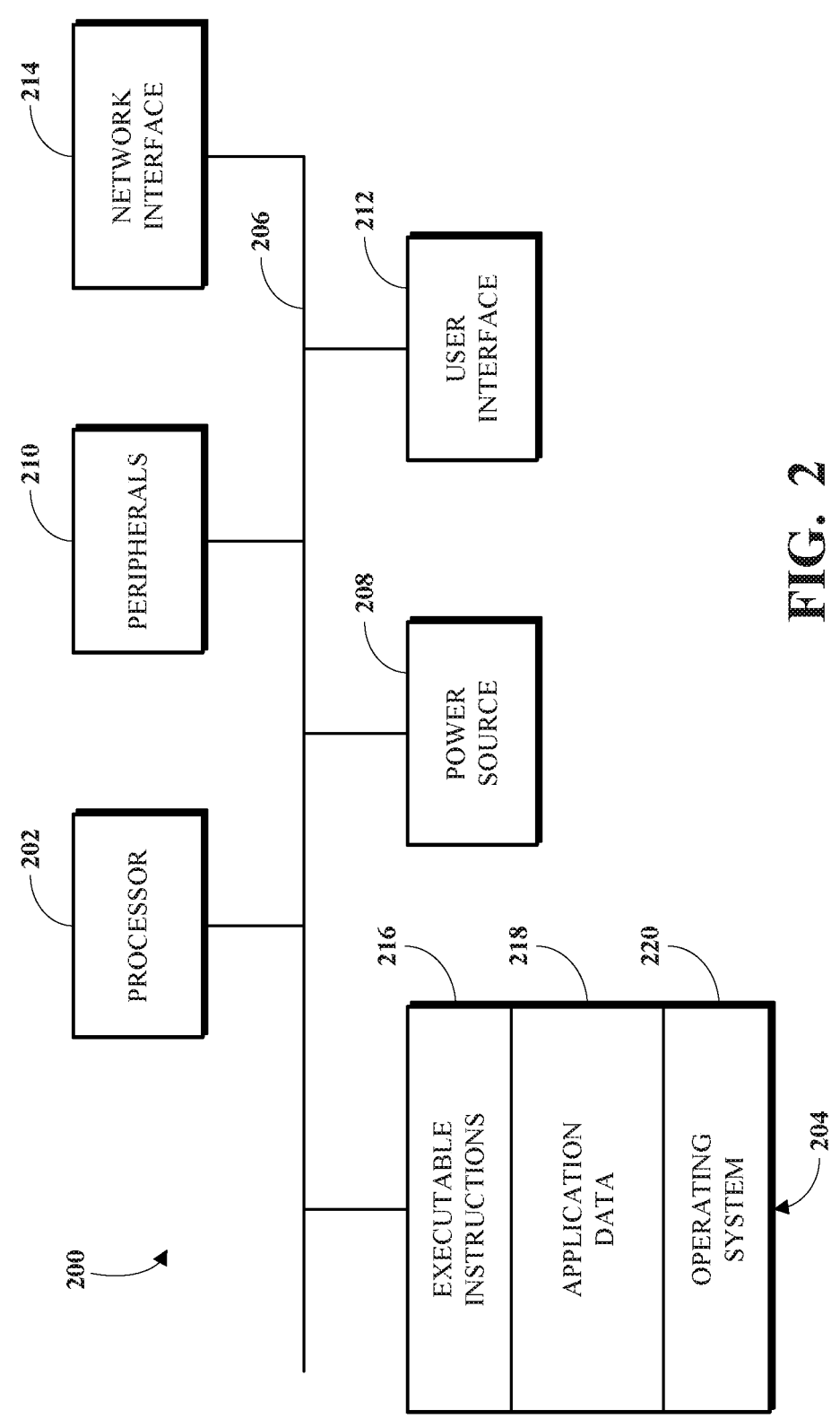
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
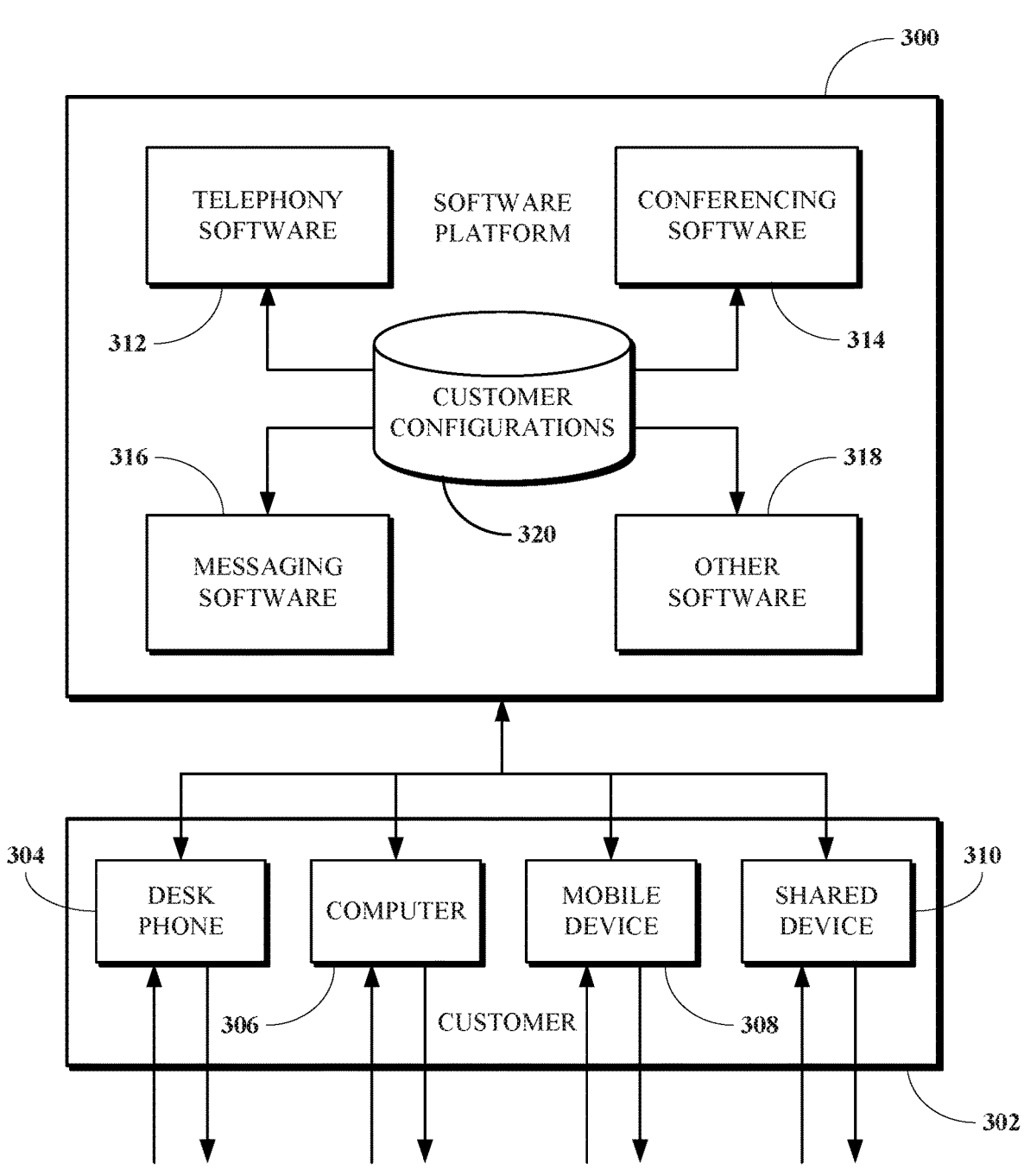
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for sharing data for presentation during a conference or receiving data for presentation during a conference.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
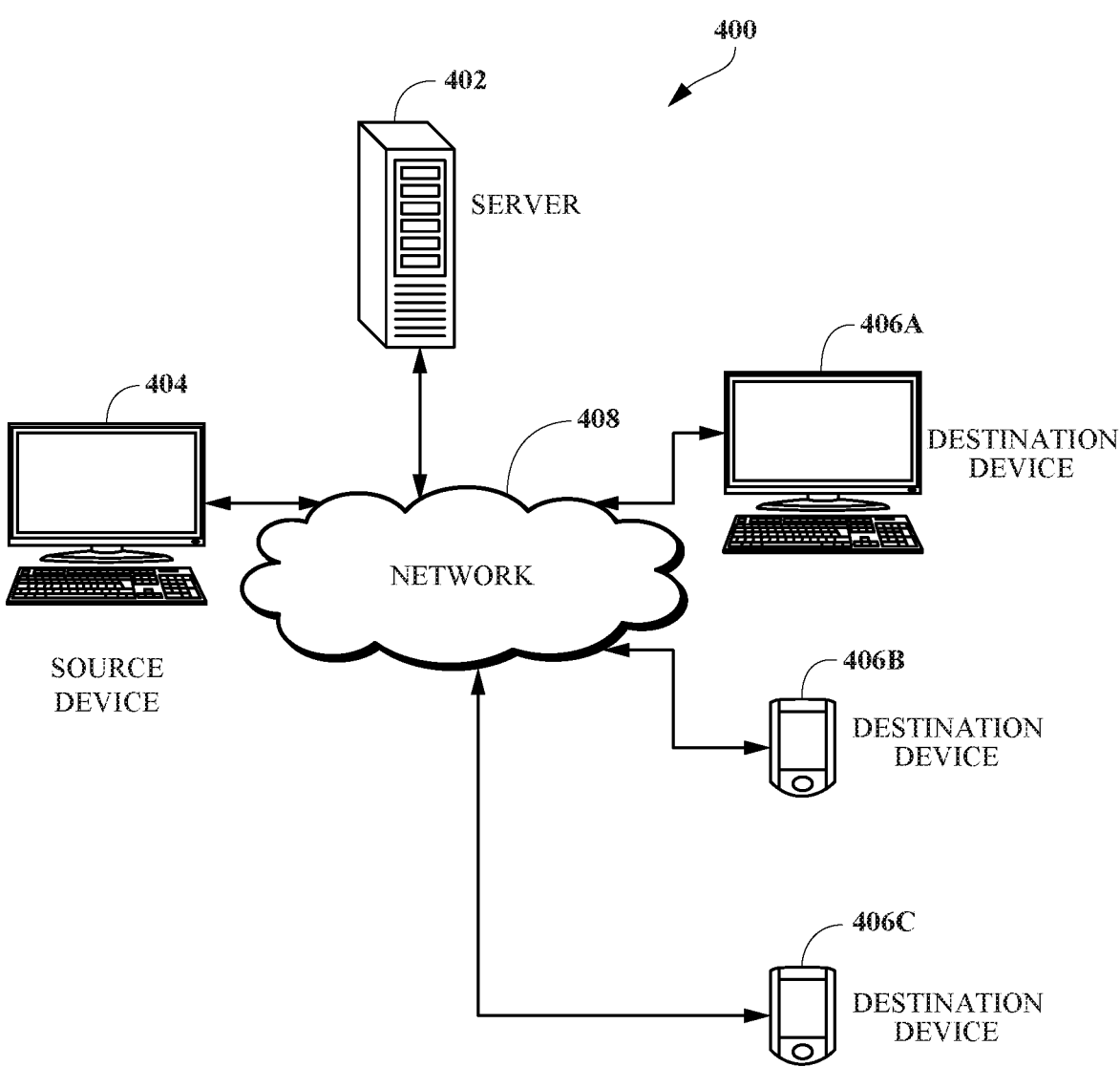
FIG. 4 is a diagram of an example of a system for sharing data for presentation during a conference.

FIG. 4 is a diagram of an example of a system 400 for sharing data for presentation during a conference. As shown, the system 400 includes a server 402, a source device 404, and destination devices 406A-406C connected to one another over a network 408. While three destination devices 406A-406C are illustrated, some implementations may include other numbers of destination devices 406A-406C. The server 402 may, for example, correspond to the application server 108 or the telephony server 112. The source device 404 may, for example, correspond to one of the clients 104A-104D. Each of the destination devices 406A-406C may correspond to one of the clients 104A-104D. The network 408 may correspond to the network 114.

According to some implementations, the source device 404 and the destination devices 406A-406C are participating in a conference, for example, an audio or video conference over the network 408 facilitated by the server 402. Before or during the conference, the source device 404 transmits shared data (e.g., one or more media files) to the destination devices 406A-406C. The source device 404 may provide the shared data, over the network 408, to the server 402. The server 402 may instruct the destination devices 406A-406C to download the shared data, for example, by transmitting a message to an application (e.g., a client application), at the destination devices 406A-406C associated with the conference. At least a portion of the destination devices 406A-406C begin downloading the shared data and transmit a download progress (e.g., n % of the shared data has been downloaded, where n is a number between 0 and 100) to the server 402. The destination devices 406A-406C may transmit the download progress through a client application associated with the conference in a message to the server 402 every n seconds, where n is a positive number, or after every predefined amount of data (e.g., 50 megabytes) is downloaded. The server 402 generates combined download progress data (e.g., m % of the destination devices 406A-406C have completed downloading the shared data) and transmits the combined download progress data to a presenter device, which is associated with a user who is responsible for presenting the shared data in the conference. The combined download progress report may indicate a number of destination devices 406A-406C that have completed downloading the shared data or downloaded a predetermined percentage (e.g., 85%) of the shared data, or a percentage of the destination devices 406A-406C that have completed downloading the shared data or downloaded the predetermined percentage of the shared data. Alternatively, the combined download progress report may report an average (e.g., mean or median) percentage of the shared data that has been downloaded at the destination devices 406A-406C. For example, if the destination device 406A has downloaded 80% of the shared data, the destination device 406B has downloaded 70% of the shared data, and the destination device 406C has downloaded 30% of the shared data, the combined download progress report may indicate the mean of 80%, 70%, and 30%, which is 60%, or the median of 80%, 70% and 30%, which is 70%. The server 402 may determine the number or the percentage based on the received download progress. The combined download progress data may be transmitted to the presenter device in a message over the network 408 for display at the presenter device via a client application associated with the conference. The presenter device may, for example, be the source device 404 or one of the destination devices 406A-406C. The presenter device prompts the user of the presenter device to select a presentation time of the shared data based on the combined download progress data. In at least some cases, the presenter device outputs suggested presentation times based on the combined download progress data. The suggested presentation time may be computed, at the server 402, for example, based on a download speed at the destination devices 406A-406C and transmitted to the presenter device over the network 408 for display via the client application associated with the conference.

A destination device 406A initiates downloading of the shared data to the memory of the destination device 406A after the server 402 notifies the destination device 406A that the shared data is available for downloading. This notification may be done via the client application associated with the conference at the destination device 406A. At a later time, the destination device 406A receives (e.g., from the presenter device) an indication that the shared data is being presented in the conference. One of two things may then happen based on whether the downloading of the shared data at the destination device 406A meets a predefined requirement, for example, the shared data being fully downloaded or downloading at a sufficient speed for uninterrupted playback. If the downloading of the shared data meets a predefined requirement (or a combination of multiple predefined requirements), the destination device 406A plays the shared data from the memory. If the downloading of the shared data does not meet the predefined requirement, the destination device 406A streams the shared data via the conference. To stream the shared data via the conference, when the shared data is presented at the presenter device, the destination device 406A engages in screen sharing with the presenter device to display the screen of the presenter device using the client application of the conference. The predefined requirement may be defined by a default value at the client application associated with the conference or communicated from the server 402. Alternatively, the server 402 or another device (e.g., the presenter device) may specify a predefined requirement for specific shared data. In some cases, the client application running at a destination device may verify that the predefined requirement is met. In other cases, the server 402 may verify that the predefined requirement is met based on information received from the client application running at a destination device.

In some cases, the shared data may be downloaded at a destination device 406A-C from the server 402 before the conference begins. For example, the server 402 may identify the shared data based on a calendar invite to the conference (e.g., using artificial intelligence techniques, such as an artificial neural network) to determine, based on the calendar invite, that a file is to be viewed during the conference. In response to determining that the file is to be viewed during the conference, the server 402 may instruct the destination devices 406A-406C to download the file from the server 402 when the destination devices meets one or more conditions for the downloading of shared data. Examples of such conditions include, but are not limited to, a destination device 406A-406C being plugged in, at least 50% charged, idle, and/or connected to a certain Wi-Fi network.

Example use cases will now be discussed to illustrate the operation of the system 400. In one example use case, the source device 404 uploads a one-minute 300 MB video to the server 402 at the beginning of a conference. The server 402 stores the 300 MB version of the video and generates a lower resolution 150 MB version of the video. The source device 404 indicates (e.g., based on a user input at a user interface of the source device 404) that the video is to be played in 60 seconds. The media is then downloaded from the server 402 to each of the destination devices 406A-406C. The destination device 406A has a high-speed data connection to the network 408 that is capable of downloading the 300 MB in 60 seconds. Thus, the destination device 406A downloads the 300 MB version of the video. The destination device 406B has a lower speed data connection to the network 408 and is capable of downloading 150 MB in two minutes. Thus, the destination device 406B downloads the 150 MB version of the video, with earlier frames being downloaded first so that they can be played as soon as they are requested. The destination device 406C has a much lower speed data connection (e.g., 1 Mbps) and is incapable of downloading either the 300 MB version or the 150 MB version by the time the video playback is requested. Accordingly, the destination device 406C streams the video via the conference using screensharing from the source device 404 (which also functions as the presenter device). Alternatively, the presenter may decide to wait longer before starting playback of the video to accommodate the destination device 406C (e.g., until the destination device 406C has downloaded all or a larger portion of the video).

In another example use case, the source device uploads a one-minute 300 MB video to the server a week before the beginning of the conference. The server 402 stores the 300 MB version of the video and generates a lower resolution 150 MB version of the video. The server identifies destination devices 406A-406C to receive the video based on invitations to the conference and instructs, via a client application associated with the conference at the destination devices 406A-406C, the destination devices 406A-406C to download the video when each destination device 406A-406C meet certain conditions (e.g., being plugged in, at least 50% charged, idle, and connected to a Wi-Fi network). Upon meeting the conditions, the destination device 406A downloads the 300 MB video. The destination device 406B does not attempt to download the video until the conference begins, as it never meets the conditions. Upon the beginning of the conference, the destination device 406B determines that its network speed is too slow to download the 300 MB version of the video before it is to be played, but the network speed is sufficient to download the 150 MB version. Thus, the destination device 406B downloads the 150 MB version. The destination device 406C never meets the conditions and connects to the conference via a low-speed network. Thus, the destination device 406C is unable to download the 300 MB or 150 MB version of the video, and instead accesses the video, during the conference, via screen sharing from the source device 404 (which also functions as the presenter device).

Figure 5:
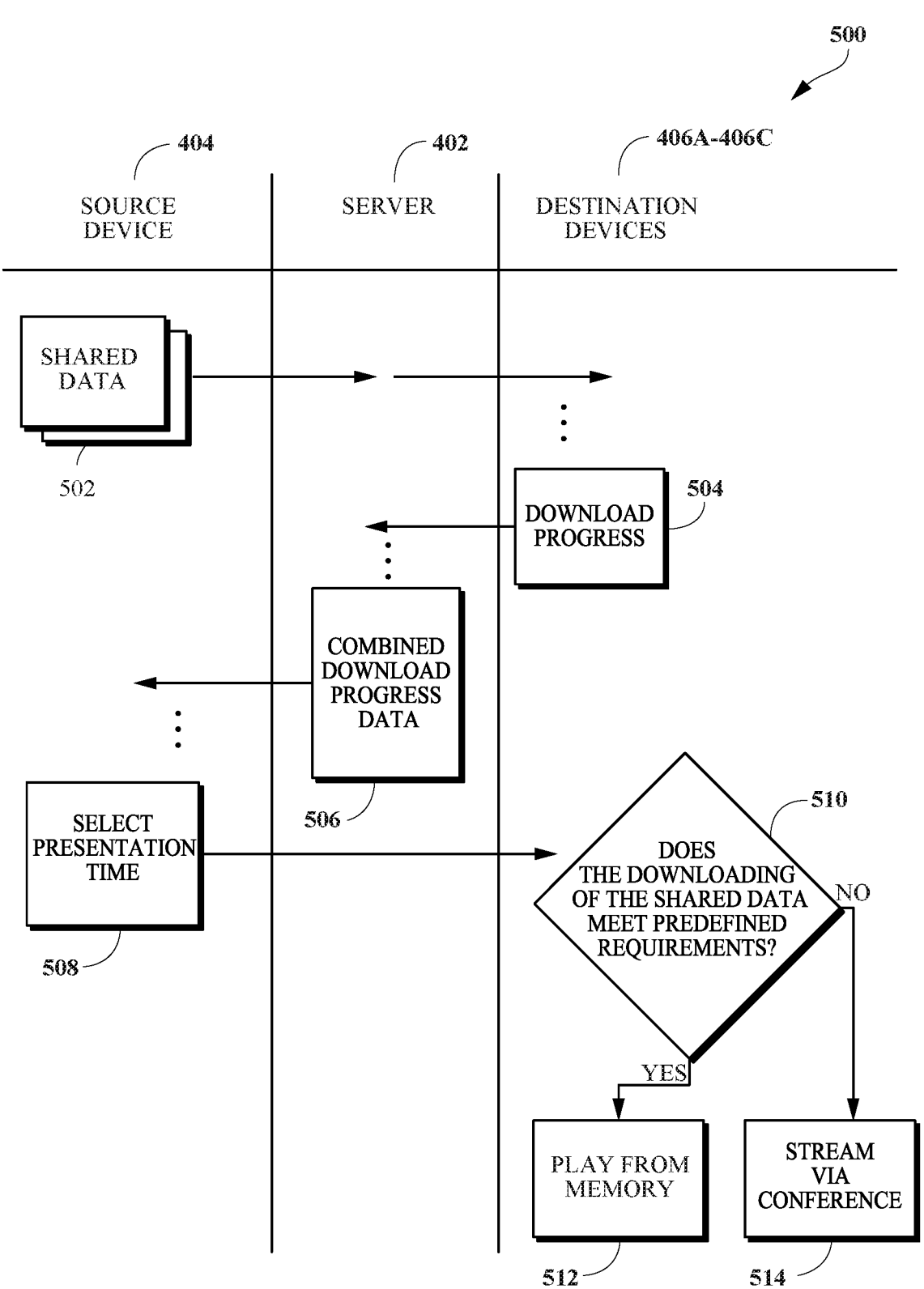
FIG. 5 is a data flow diagram for sharing data for presentation during a conference.

FIG. 5 is a data flow diagram 500 for sharing data for presentation during a conference. As shown, the data flow diagram 500 illustrates data flow between the server 402, the source device 404, and the destination devices 406A-406C. The operations illustrated in the data flow diagram 500 may be performed during a conference. As described in conjunction with FIG. 5, the source device 404 is the presenter device. However, in alternative implementations, one of the destination devices 406A-406C may be the presenter device.

At block 502, the source device 404 transmits shared data to the server 402. The server 402 transmits the shared data to the destination devices 406A-406C. A destination device 406A may determine whether a network download speed of that destination device is sufficient to download the shared data and, if so, begin downloading the shared data. The destination device 406A may determine whether the download speed is sufficient based on the download speed, a file size of the shared data, a length in time of the shared data, and an amount of time until the end of the conference. Alternatively, the determination of whether the download speed is sufficient at one or more of the destination devices 406A-406C may be made at the server 402 if the server has access to network speed data of the destination devices 406A-406C (e.g., based on previous transmissions between the server 402 and the destination devices 406A-406C).

At block 504, each of the destination devices 406A-406C that is downloading the shared data transmits download progress data to the server 402. In some cases, if the server is able to track bits that are accessed by the destination devices 406A-406C, the server 402 may determine the download progress on its own based on the bits that are being accessed or have been accessed by the destination devices 406A-406C. The download progress data indicates whether a destination device 406A is downloading the shared data and, if so, what percentage of each data item in the shared data has been downloaded. In some implementations, a destination device 406A transmits the download progress every k seconds (where k is a positive integer). In some implementations, the destination device 406A transmits the download progress whenever an additional k bytes have been downloaded. For example, the download progress may be transmitted every 5 seconds or every 50 MB. In some implementations, the server 402 periodically requests the download progress from the destination device 406A and receives the download progress in response to each request. For example, the server 402 may request, from the destination device 406A, the download progress every 5 seconds until downloading is completed at the destination device 406A.

Figure 8:
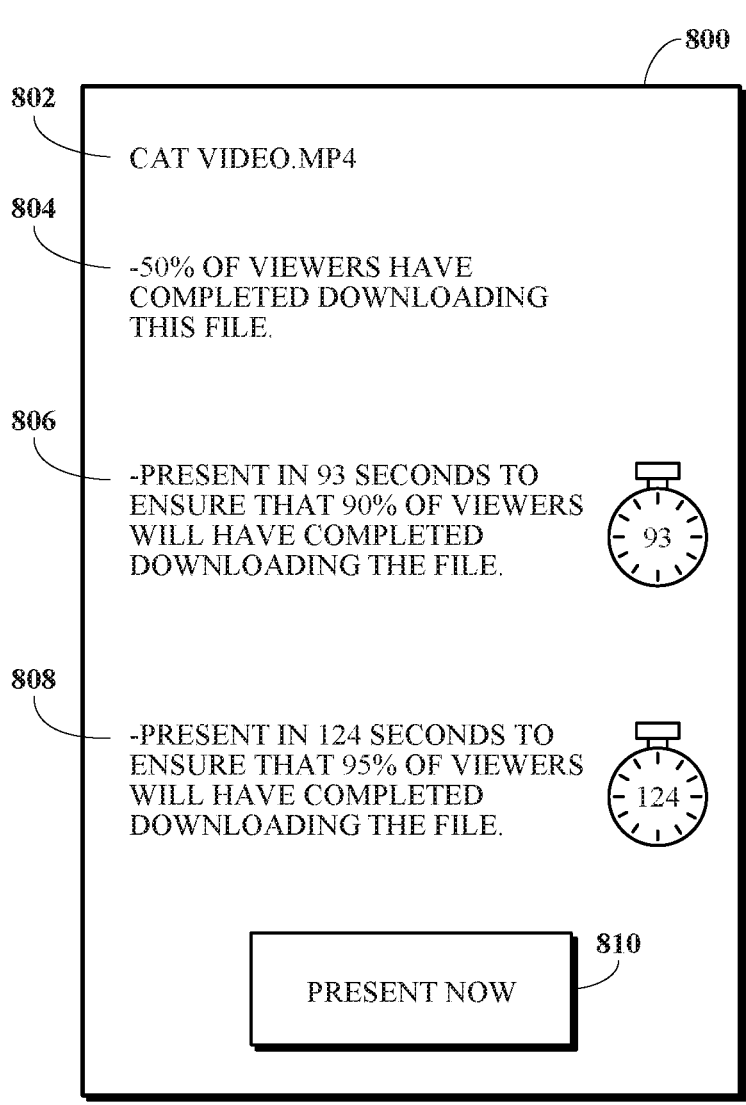
FIG. 8 illustrates a first graphical user interface for viewing combined download progress data.
Figure 9:
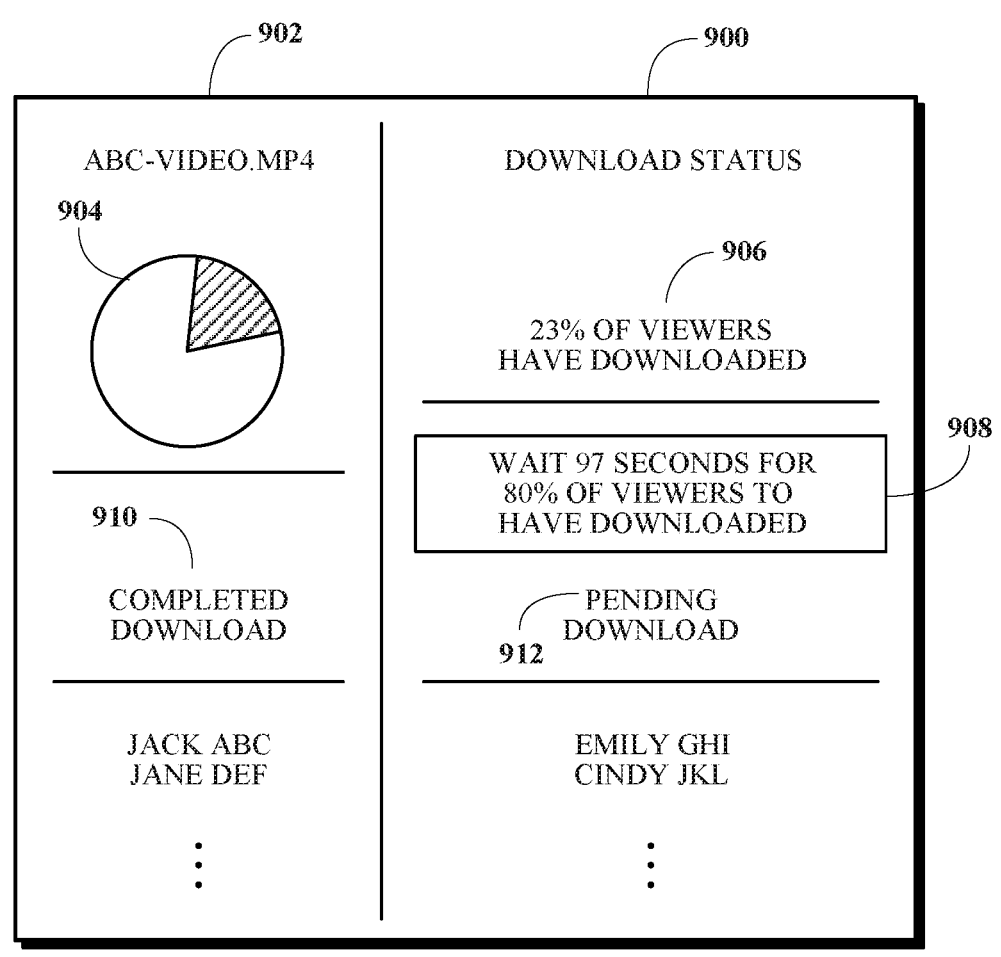
FIG. 9 illustrates a second graphical user interface for viewing combined download progress data.

At block 506, the server 402 combines the download progress (received at block 504) into combined download progress data. For example, the server may compute a number of destination devices 406A-406C that have completed downloading the shared data. Alternatively, the server may compute a mean of the download percentages at the destination devices. For example, if the destination device 406A downloaded 90% of the shared data, the destination device 406B downloaded 70% of the shared data, and the destination device 406C downloaded 50% of the shared data, the combined download progress may correspond to the mean of 90%, 70%, and 50%, which is 70%. The server 402 then transmits the combined download progress data to the source device 404 (or to another presenter device if another presenter device has been specified) for display thereat (e.g., as shown in FIG. 8 or FIG. 9 and described in detail below). In some implementations, the combined download progress data may be presented at another device associated with an account used for the conference at the presenter device instead of such data being presented at the presenter device itself. For example, if the presenter device is a laptop computer, the combined download progress data may be presented at a mobile phone associated with the same account as is logged into for the conference at the laptop computer to avoid cluttering the screen of the laptop computer. The combined download progress data may indicate at least one of: a number or percentage of the destination devices 406A-406C where the downloading of the shared data meets a predefined requirement, whether the predefined requirement is met at a specified destination device 406A, and the like.

At block 508, a user of the source device 404 selects the presentation time for the shared data in response to a representation of the combined download progress data being presented via a GUI of the source device 404 (e.g., as shown in FIG. 8 or FIG. 9 and described in detail below). As shown in FIG. 8 and FIG. 9, one or more presentation times may be proposed to the user of the source device 404 via the GUI. Upon reaching a desired presentation time, the user of the source device 404 may select a button for presenting the shared data. The proposed presentation times may be computed based on at least one of the combined download progress, the length of the shared data, and an end time of the conference. For example, the proposed presentation times may correspond to: a time when 90% of the destination devices 406A-406C are expected to have fully downloaded the shared data, a time when 95% of the destination devices 406A-406C are expected to have fully downloaded the shared data, and a time length of the shared data (if the shared data is a video) before an expected end time of the conference. At the presentation time, the source device 404 notifies the destination devices 406A-406C that the shared data is to be played.

At block 510, the source device 404 notifies the destination devices 406A-406C that playing of the shared data is to start. In response, a destination device 406A of the destination devices 406A-406C determines whether the downloading of the shared data meets predefined requirements. If so, at block 512, the destination device 406A plays the shared data from the memory of the destination device 406A. If not, at block 514, the destination device 406A streams the shared data via the conference.

In one example use case, at block 502, the source device 404 uploads shared data including a one-minute 300 MB video to the server 402. The server 402 stores the 300 MB video and forwards the 300 MB video to the destination device 406A. At block 504, while downloading the 300 MB video, the destination device 406A periodically shares its download progress with the server 402. For example, the download progress may be shared every 15 seconds or every 50 MB. At block 506, the server 402 generates combined download progress data based on the download progress of the destination device 406A and other destination devices. The server transmits the combined download progress data to the source device 404, which also functions as the presenter device. At block 508, the user of the source device 404 selects a presentation time based on the combined download progress data. At block 510, at the occurrence of the presentation time, the destination devices each determine whether the shared data has been fully downloaded or is downloading at a sufficient speed for uninterrupted playback. For example, the destination device 406A may have fully downloaded the video. As another example, the destination device 406B may be in the process of downloading the video but will have downloaded each frame by the time it is expected to be played. In yet another example, the destination device 406C may have a poor network connection and be unable to download the video. Thus, per block 512, the destination devices 406A and 406B may play the video from memory. Per block 514, the destination device 406C may stream the video via the conference if able.

As described above, in a conference, the source device 404 shares data with destination devices 406A-406C. Some destination devices 406A, 406B download the shared data before the sharing session and play the shared data from memory. Other destination devices 406C stream the shared data via the conference.

Figure 6:
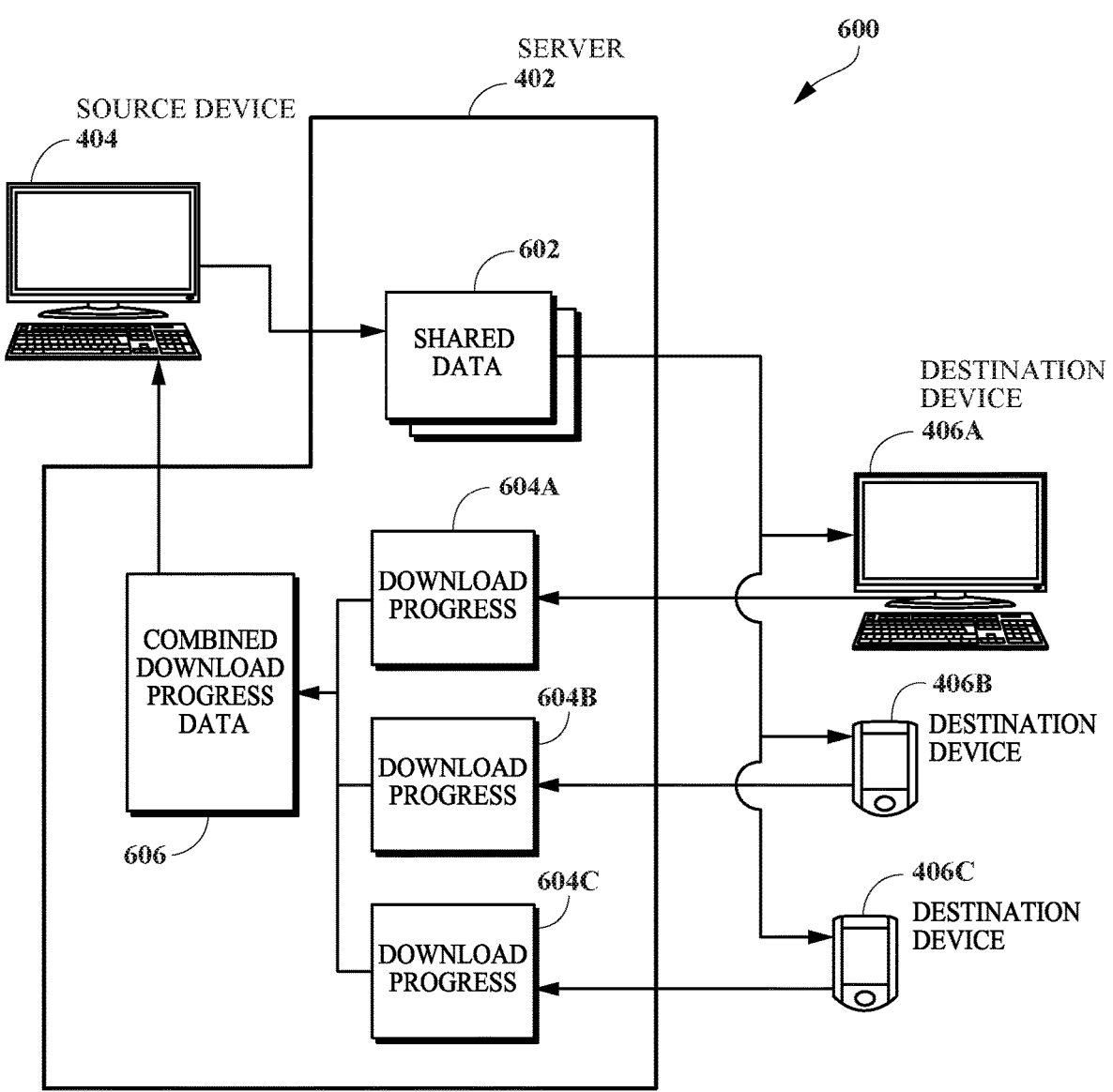
FIG. 6 is a diagram of an example of a server for sharing data for presentation during a conference.

FIG. 6 is a diagram of an example of a detailed view of data processed and stored at the server 402. As shown, a system 600 includes the server 402, the source device 404, and destination devices 406A-406C. As described in conjunction with FIG. 6, the source device 404 is the presenter device. However, in alternative implementations, one of the destination devices 406A-406C may be the presenter device.

As shown in FIG. 6, the source device 404 transmits shared data 602 to the server 402. The server 402 transmits the shared data 602 to the destination devices 406A-406C for download thereat. The destination devices 406A-406C begin downloading the shared data 602. The destination devices 406A-406C transmit their download progress 604A-604C to the server 402, with download progress 604A corresponding to destination device 406A, download progress 604B corresponding to destination device 406B, and download progress 604C corresponding to destination device 406C. The server 402 generates combined download progress data 606 based on the download progress 604A-604C received from the destination devices 406A-406C. The combined download progress data may correspond to a mean download progress percentage or a number of destination devices 406A-406C that have fully completed downloading the shared data. Alternatively, the combined download progress data 606 may be any mathematical or logical combination of the download progress 604A-604C. The server 402 transmits the combined download progress data 606 to the source device 404 (or, alternatively, to another presenter device) to allow a user of the source device 404 (or the other presenter device) to select a time to present the shared data based on the combined download progress data 606.

In some implementations, the combined download progress data 606 includes a number or a proportion of the destination devices 406A-406C that completed downloading at least a predefined portion of the shared data 602. The predefined portion of the shared data 602 may include predefined files in the shared data 602. In some implementations, the combined download progress data 606 includes an indication whether a specific destination device 406A of the destination devices 406A-406C completed downloading the shared data.

In some implementations, the shared data 602 includes a video file (or another file type that could have multiple resolutions, such as an image file). When the source device 404 uploads the video file to the server 402, the server may transcode the video file into multiple different resolution versions (e.g., a low, medium, and high-resolution version). The destination devices 406A-406C may be assigned, by the server or by the destination devices themselves, to download one of the low, medium or high-resolution versions based on constraints (e.g., display size or display pixel density) of the destination device 406A-406C, a network speed at the destination device 406A-406C, and an amount of time until the video file is to be presented in the conference. The server 402 provides, to the destination device 406A-406C, a request to download shared data to the destination device 406A-406C. The server 402 prompts the destination device 406A-406C to provide display settings and network settings of the destination device 406A-406C to process the request. The server 402 determines a resolution version of the shared data for provision to the destination device 406A-406C based on the display settings and the network settings. The server 402 transmits the shared data of the determined resolution version to the destination device 406A-406C. In one example, the destination device 406A is a high-end device with a large monitor that is capable of downloading and playing high-resolution video. Thus, the destination device 406A downloads the high-resolution version of the video in the shared data 602. The destination device 406B is a lower end device (e.g., a mobile phone with a smaller or lower-resolution screen) that can only playback medium-resolution videos (or downsampled versions of high-resolution videos). Thus, the destination device 406B may download the medium-resolution version of the video in the shared data 602, even if its network connection is sufficient for downloading the high-resolution version.

Figure 7:
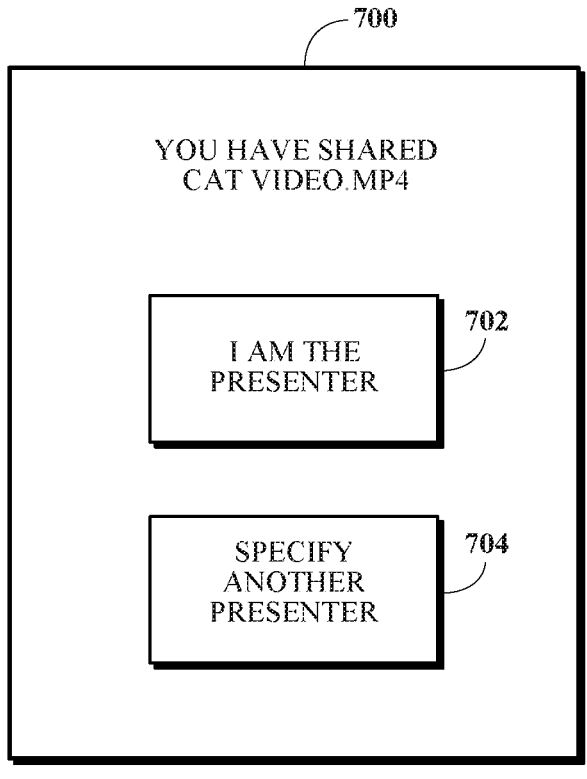
FIG. 7 illustrates a graphical user interface for selecting a presenter device.

FIG. 7 illustrates a GUI 700 for selecting a presenter device. The GUI 700 may be presented at the source device 404 after the source device 404 transmits the shared data 602. As shown, the GUI identifies the shared data ("abc-video.mp4"). The GUI 700 includes an "I am the presenter" button 702 and "specify another presenter" button 704, which are selectable by a user of the source device 404, for example, by clicking a mouse or touching a touchscreen.

If the user selects the "I am the presenter" button 702, the source device 404 functions as the presenter device. The source device 404 notifies the server 402 that the source device 404 is the presenter device. Alternatively, if the user selects the "specify another presenter" button 704, the user may be able to identify one of the destination devices 406A-406C to serve as the presenter device. The destination devices 406A-406C may be identified, by the user, based on an identifier of an account accessing the conference from each of the destination devices 406A-406C. The identifier may correspond to at least one of a name, an email address, a telephone number, a user identifier in a conferencing application, or an account number in the conferencing application. In some implementations, upon selection of the "specify another presenter" button 704, the GUI displays a dropdown list of identifiers for the user to select one of the identifiers as being associated with the presenter device.

FIG. 8 illustrates a first GUI 800 for viewing combined download progress data 606 at the presenter device. As shown, the GUI 800 indicates a filename 802 ("ABC-VIDEO.MP4") associated with the shared data 602. At position 804, the GUI 800 indicates a percentage (50%) of destination devices 406 ("viewers") that have completed downloading the shared data. At position 806, the GUI 800 indicates an estimated amount of time (93 seconds) to wait so that 90% of the destination devices 406 will have completed downloading the shared data. At position 808, the GUI 800 further indicates an estimated amount of time (124 seconds) to wait so that 95% of the destination devices 406 will have downloaded the shared data.

The information presented at positions 804, 806, and 808 may be periodically updated. For example, the estimated amounts of time to wait (at positions 806 and 808) may decrease as time passes. The percentage of the destination devices 406A-406C that have completed downloading the shared data (at position 804) may increase as time passes.

As shown, the GUI 800 also includes a "present now" button 810. Upon determining that an appropriate percentage of the destination devices have completed downloading the shared data 606 or that other criteria (e.g., timing) justify presenting the shared data 606, the user of the presenter device may select the "present now" button 810 to begin presenting the shared data to the conference using the techniques disclosed herein.

To generate the GUI 800, the server 402 predicts a download completion time (e.g., in 93 seconds or 124 seconds, as shown) when at least a threshold number or threshold percentage of the destination devices 406 are predicted to have completed downloading the shared data 602. The server 402 transmits the predicted download completion time to the presenter device for display via the GUI 800. The user of the presenter device is prompted to select the presentation time via the GUI 800 by selecting the "present now" button 810 at the presentation time. As shown in the GUI 800, in some cases, multiple download completion times (e.g., when different percentages of the destination devices 406 will have completed downloading the shared data 602) may be predicted.

FIG. 9 illustrates a second GUI 900 for viewing combined download progress data 606 at the presenter device. As shown, the GUI 900 indicates a filename (ABC-VIDEO.MP4) of the shared data 602. The GUI 900 illustrates a pie chart showing the percentage of destination devices 406 ("viewers") that have completed downloading the shared data 602. The percentage is also shown as a number (23%)

at position 906. Position 908 indicates an amount of time to wait until 80% of the destination devices 406A-406C have completed downloading the shared data 602. Position 910 lists user identifiers associated with destination devices 406 that have completed downloading the shared data. Position 912 lists user identifiers associated with destination devices 406 that have not completed downloading the shared data.

Figure 10:
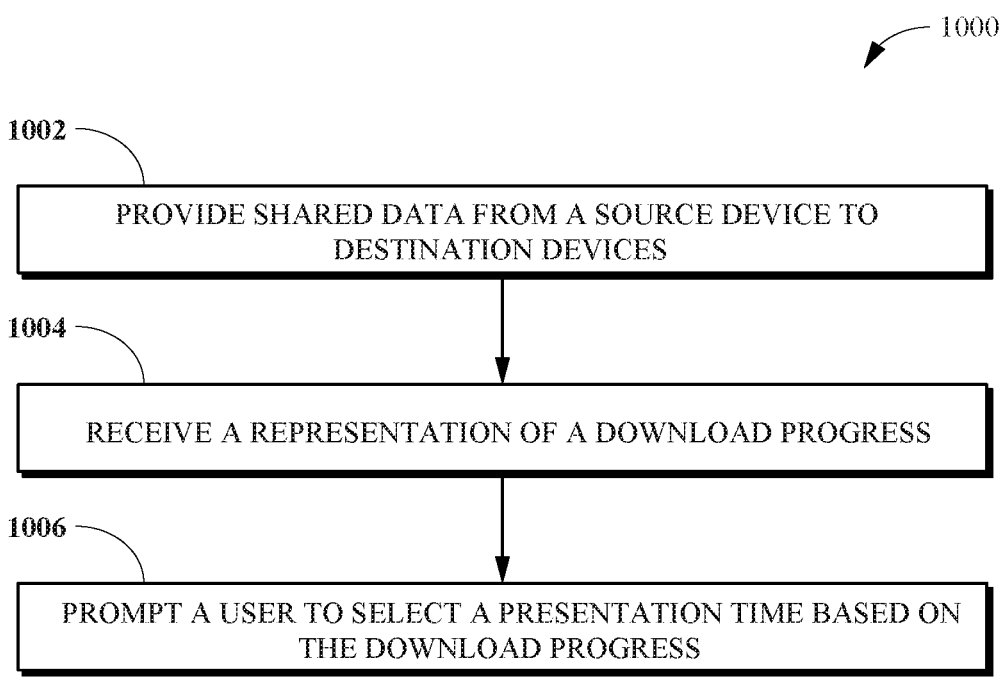
FIG. 10 is a flowchart of an example of a technique for sharing data for presentation during a conference.
Figure 11:
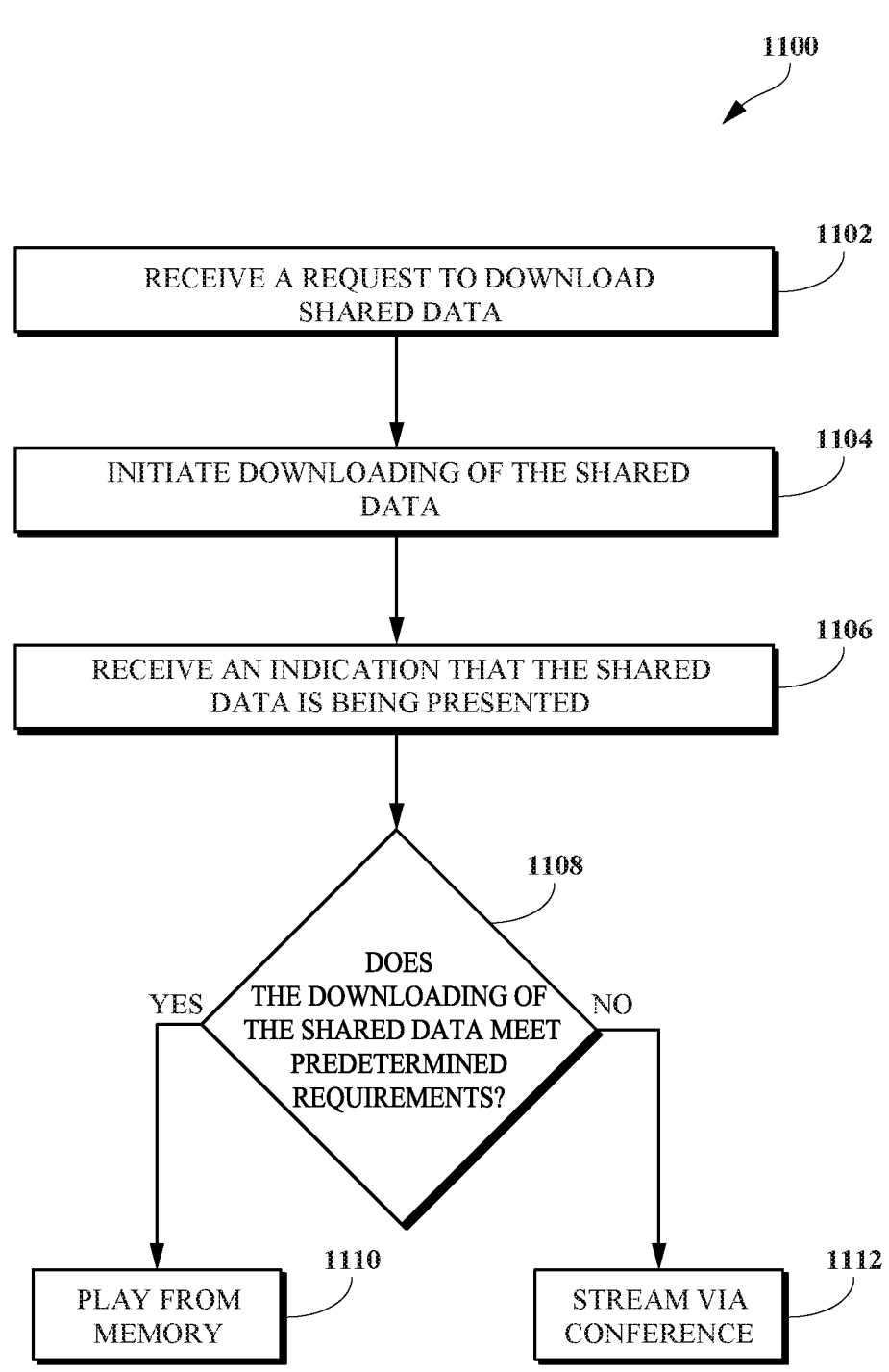
FIG. 11 is a flowchart of an example of a technique for receiving shared data for presentation during a conference.

To further describe some implementations in greater detail, reference is next made to examples of techniques for sharing data for presentation during a conference. FIG. 10 is a flowchart of an example of a technique 1000 for sharing data for presentation during a conference. FIG. 11 is a flowchart of an example of a technique 1100 for receiving shared data for presentation during a conference. The techniques 1000 and 1100 can be executed using computing devices, such as the systems, hardware, and software described with respect to FIGS. 1-9. The techniques 1000 and 1100 can be performed, for example, by executing a machine-readable program or other computer-executable instructions, such as routines, instructions, programs, or other code. The steps, or operations, of the techniques 1000 and 1100 or another technique, method, process, or algorithm described in connection with the implementations disclosed herein can be implemented directly in hardware, firmware, software executed by hardware, circuitry, or a combination thereof.

For simplicity of explanation, the techniques 1000 and 1100 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

As described above, FIG. 10 is a flowchart of an example of a technique 1000 for sharing data for presentation during a conference. The technique 1000 may, for example, be performed by the server 402 working with the source device 404 and the destination devices 406.

At block 1002, the server 402 provides (e.g., transmits) shared data 602 from the source device 404 to the destination devices 406. In some implementations, the source device 404 transmits the shared data 602 to the server 402 for storage thereat. The server 402 instructs the destination devices 406 to download the shared data 602 from the server 402. The source device 404 and the destination devices 406 may be participating in a conference, and the shared data 602 may be transmitted during the conference. Alternatively, the source device 404 may transmit shared data 602 for a future conference for storage at the server 402 and downloading to the destination devices 406 which were invited to participate in the conference, for example, via email or a calendar invite. A destination device 406A may prompt the user for approval to download the data and, upon receiving user approval, download the shared data. In some implementations, the destination device 406A downloads the shared data when certain conditions (e.g., at least one of being plugged in, being idle, being connected to Wi-Fi®, having a network download speed exceeding 10 megabits per second, or the battery being at least 50% charged) are met at the destination device.

At block 1004, the server 402 receives a representation of the download progress 604 of the shared data 602 at the destination devices 406. In some cases, each destination device 406 periodically (e.g., once every 5 seconds or once every 10 seconds) notifies the server 402 of the download progress 604 at the destination device 406. The server 402 combines the download progress 604 values to create combined download progress data 606 representing, for example, a percentage of the destination devices 406 that have fully downloaded the shared data 602. The server 402 transmits the combined download progress data 606 to the presenter device. The presenter device may display the received combined download progress data 606 via a GUI at the presenter device. In some cases, the presenter device is the source device 404. Alternatively, the presenter device may be one of the destination devices 406.

At block 1006, the server 402 prompts, via a GUI at the presenter device, a user of the presenter device to select a presentation time based on the download progress. For example, the server 402 may cause (for example, by transmitting messages, over the network 408, to a client application associated with the conference at the presenter device) the presenter device to display the GUI 800 of FIG. 8 or the GUI 900 of FIG. 9. The GUI at the presenter device may indicate a current download progress level (e.g., 50% of the destination devices 406 have completed downloading) at the destination devices 406 and propose that the presentation time be set to a time when a predefined download progress metric (e.g., 95% of the destination devices 406 have completed downloading) is met. In some implementations, the user of the presenter device is prompted, during the conference and via a GUI associated with the conference, to set the presentation time to a time when a predefined percentage of the one or more destination devices is predicted to have downloaded the shared data.

As described above, FIG. 11 is a flowchart of an example of a technique 1100 for receiving shared data for presentation during a conference. The technique 1100 is described below as being performed by the destination device 406A. However, the technique 1100 may, for example, be performed by any of the destination devices 406A-406C.

At block 1102, the destination device 406A receives a request to download the shared data 602. The request may be received from the server 402 in response to the shared data 602 being uploaded to the server 402 by the source device 404 during a conference in which the source device 404 and the destination device 406A are participating. Upon receiving the request, the destination device 406A may verify that network conditions (e.g., a network download speed) are adequate for downloading the shared data 602 during the conference. For example, the destination device 406A may verify that the destination device 406A is capable of completing the download before the end of the conference based on an amount of time until the end of the conference, a size of the shared data 602, and the network download speed.

At block 1104, the destination device 406A initiates downloading of the shared data 602 to a memory (e.g., the memory 204) of the destination device 406A in response to the request. While downloading the shared data 602, the destination device 406A periodically notifies the server 402 of the download progress 604A. For example, the destination device 406A may transmit the download progress 604A every 5 seconds, after every 10 megabytes are downloaded, or in response to requests for the download progress 604A from the server 402.

At block 1106, the destination device 406A receives an indication that the shared data 602 is being presented. In some implementations, the presenter device provides an indication that the shared data 602 is being presented via the conference, and that indication is received at devices participating in the conference, including the destination device 406A. The indication may be received after the shared data

602 has been fully downloaded, when only a portion of the shared data has been downloaded, or after the destination device 406A determined not to download the shared data (e.g., based on the network conditions) or had a download error.

At block 1108, the destination device 406A determines whether the downloading of the shared data 602 meets a predetermined requirement. The predefined requirement may include the shared data being fully downloaded or downloading at a sufficient speed for uninterrupted playback. The shared data 602 is downloading at the sufficient speed for uninterrupted playback if each frame of the shared data 602 is expected to be downloaded before it is to be played. For example, if a ten-minute video is 50% downloaded and the remaining 50% is expected to download within ten minutes, then the ten-minute video is downloading at the sufficient speed for uninterrupted playback.

According to some implementations, the shared data 602 includes multiple files to be presented at different times during the conference. A user of the source device 404 specifies (e.g., via a GUI) an order in which the multiple files are to be presented in the conference. The destination device 406A downloads the multiple files according to the specified order.

If the downloading of the shared data meets the predetermined requirement, the technique 1100 continues to block 1110. At block 1110, upon determining that the downloading of the shared data 602 meets the predetermined requirement, the destination device 406A plays the shared data 602 from the memory of the destination device 406A. The shared data 602 may be played from the memory in response to the received (at block 1106) indication and without a user input for playing the shared data from a user of the destination device 406A. After block 1110, the technique 1100 ends.

If the downloading of the shared data 602 does not meet the predetermined requirement, the technique 1100 continues to block 1112. At block 1112, upon determining that the downloading of the shared data does not meet the predetermined requirement, the destination device 406A streams the shared data 602 via the conference. After block 1112, the technique 1100 ends.

Some implementations are described as being implemented in conjunction with sharing or receiving data for presentation during a conference. However, in alternative implementations, the data may be shared or received in any event, not necessarily a conference. For example, a member of a group that is watching a movie together might share some slides or photographs for presentation during a break in the movie. The member may transmit the photographs for receipt by other members of the group using the techniques disclosed herein.

Some implementations are described below as numbered examples (Example 1, 2, 3, etc.). These examples are provided as exampled only and do not limit the disclosed technology.

Example 1 is a method comprising: providing, during a conference, shared data from a source device participating in the conference to one or more destination devices participating in the conference; receiving a representation of a download progress of the shared data at the one or more destination devices; and prompting a user of a presenter device to select a presentation time of the shared data based on the download progress, wherein the presenter device is the source device or one of the one or more destination devices.

In Example 2, the subject matter of Example 1 includes, wherein the user of the presenter device is prompted, during the conference and via a graphical user interface associated with the conference, to set the presentation time to a time when a predefined percentage of the one or more destination devices is predicted to have downloaded the shared data.

In Example 3, the subject matter of Examples 1-2 includes, wherein the representation of the download progress comprises a number or a proportion of the one or more destination devices that completed downloading at least a predefined portion of the shared data.

In Example 4, the subject matter of Examples 1-3 includes, wherein the representation of the download progress comprises an indication whether a destination device of the one or more destination devices completed downloading the shared data.

In Example 5, the subject matter of Examples 1-4 includes, predicting a download completion time when at least a threshold number of the one or more destination devices are predicted to have completed downloading the shared data, wherein the user of the presenter device is prompted to select the presentation time via a graphical user interface that displays the predicted download completion time.

In Example 6, the subject matter of Examples 1-5 includes, predicting a first download completion time when at least a first threshold number of the one or more destination devices are predicted to have completed downloading the shared data; and predicting a second download completion time when at least a second threshold number of the one or more destination devices are predicted to have completed downloading the shared data, wherein the user of the presenter device is prompted to select the presentation time via a graphical user interface that displays the first download completion time and the second download completion time.

In Example 7, the subject matter of Examples 1-6 includes, wherein the source device is different from the presenter device, the method further comprising: prompting a user of the source device to identify the presenter device via a graphical user interface at the source device.

Example 8 is an apparatus comprising: a memory; and a processor configured to execute instructions stored in the memory to: provide, during a conference, shared data from a source device participating in the conference to one or more destination devices participating in the conference; receive a representation of a download progress of the shared data at the one or more destination devices; and prompt a user of a presenter device to select a presentation time of the shared data based on the download progress, wherein the presenter device is the source device or one of the one or more destination devices.

In Example 9, the subject matter of Example 8 includes, wherein the user of the source device is prompted, during the conference and via a graphical user interface associated with the conference, to set the presentation time to a time when a predefined percentage of the one or more destination devices is predicted to have downloaded the shared data.

In Example 10, the subject matter of Examples 8-9 includes, wherein the representation of the download progress comprises a number or a proportion of the one or more destination devices that completed downloading at least a predefined portion of the shared data.

In Example 11, the subject matter of Examples 8-10 includes, wherein the representation of the download progress comprises an indication whether a destination device of the one or more destination devices completed downloading the shared data.

In Example 12, the subject matter of Examples 8-11 includes, wherein the processor is further configured to execute instructions stored in the memory to: predict a download completion time when at least a threshold number of the one or more destination devices are predicted to have completed downloading the shared data, wherein the user of the source device is prompted to select the presentation time via a graphical user interface that displays the predicted download completion time.

In Example 13, the subject matter of Examples 8-12 includes, wherein the processor is further configured to execute instructions stored in the memory to: predict a first download completion time when at least a first threshold number of the one or more destination devices are predicted to have completed downloading the shared data; and predict a second download completion time when at least a second threshold number of the one or more destination devices are predicted to have completed downloading the shared data, wherein the user of the source device is prompted to select the presentation time via a graphical user interface that displays the first download completion time and the second download completion time.

Example 14 is a non-transitory computer-readable medium storing instructions operable to cause one or more processors to perform operations comprising: providing, during a conference, shared data from a source device participating in the conference to one or more destination devices participating in the conference; receiving a representation of a download progress of the shared data at the one or more destination devices; and prompting a user of a presenter device to select a presentation time of the shared data based on the download progress, wherein the presenter device is the source device or one of the one or more destination devices.

In Example 15, the subject matter of Example 14 includes, wherein the source device is different from the presenter device, the operations further comprising: prompting a user of the source device to identify the presenter device via a graphical user interface at the source device.

In Example 16, the subject matter of Examples 14-15 includes, wherein the user of the presenter device is prompted, during the conference and via a graphical user interface associated with the conference, to set the presentation time to a time when a predefined percentage of the one or more destination devices is predicted to have downloaded the shared data.

In Example 17, the subject matter of Examples 14-16 includes, wherein the representation of the download progress comprises a number or a proportion of the one or more destination devices that completed downloading at least a predefined portion of the shared data.

In Example 18, the subject matter of Examples 14-17 includes, wherein the representation of the download progress comprises an indication whether a destination device of the one or more destination devices completed downloading the shared data.

In Example 19, the subject matter of Examples 14-18 includes, the operations further comprising: predicting a download completion time when at least a threshold number of the one or more destination devices are predicted to have completed downloading the shared data, wherein the user of the presenter device is prompted to select the presentation time via a graphical user interface that displays the predicted download completion time.

In Example 20, the subject matter of Examples 14-19 includes, the operations further comprising: predicting a first download completion time when at least a first threshold number of the one or more destination devices are predicted to have completed downloading the shared data; and predicting a second download completion time when at least a second threshold number of the one or more destination devices are predicted to have completed downloading the shared data, wherein the user of the presenter device is prompted to select the presentation time via a graphical user interface that displays the first download completion time and the second download completion time.

Example 21 is an apparatus comprising: a memory; and a processor configured to execute instructions stored in the memory to: receive a request to download shared data; initiate downloading of the shared data to the memory in response to the request; receive an indication that the shared data is being presented in a conference; and play the shared data from the memory if the downloading of the shared data meets a predefined requirement.

In Example 22, the subject matter of Example 21 includes, wherein the processor is further configured to execute the instructions stored in the memory to: stream the shared data via the conference if the downloading of the shared data does not meet the predefined requirement.

In Example 23, the subject matter of Examples 21-22 includes, wherein the predefined requirement comprises the shared data being fully downloaded or downloading at a sufficient speed for uninterrupted playback.

In Example 24, the subject matter of Examples 21-23 includes, wherein the shared data comprises a video file, the processor further configured to execute the instructions stored in the memory to: determine whether the shared data is downloading at a sufficient speed for uninterrupted playback based on a download speed, a size of the shared data, and a proportion of the shared data that is already downloaded.

In Example 25, the subject matter of Examples 21-24 includes, wherein the shared data comprises multiple files to be presented at different times during the conference, wherein the multiple files are downloaded based on an order specified in the request to download the shared data.

In Example 26, the subject matter of Examples 21-25 includes, wherein the processor is further configured to execute the instructions stored in the memory to: provide a download status of the shared data.

In Example 27, the subject matter of Examples 21-26 includes, wherein the downloading of the shared data meets the predefined requirement, wherein the shared data is accessed from the memory in response to the received indication and without a user input for playing the shared data from a user of the apparatus.

In Example 28, the subject matter of Examples 21-27 includes, wherein the request to download the shared data is received from a server associated with the conference.

Example 29 is a method comprising: receiving a request to download shared data; initiating downloading of the shared data to a memory in response to the request; receiving an indication that the shared data is being presented in a conference; and playing the shared data from the memory if the downloading of the shared data meets a predefined requirement.

In Example 30, the subject matter of Example 29 includes, wherein the predefined requirement comprises the shared data being fully downloaded or downloading at a sufficient speed for uninterrupted playback.

In Example 31, the subject matter of Examples 29-30 includes, wherein the shared data comprises a video file, the method further comprising: determining whether the shared data is downloading at a sufficient speed for uninterrupted playback based on a download speed, a size of the shared data, and a proportion of the shared data that is already downloaded.

In Example 32, the subject matter of Examples 29-31 includes, wherein the shared data comprises multiple files to be presented at different times during the conference, wherein the multiple files are downloaded based on an order specified in the request to download the shared data.

In Example 33, the subject matter of Examples 29-32 includes, providing a download status of the shared data.

In Example 34, the subject matter of Examples 29-33 includes, wherein the shared data is accessed from the memory in response to the received indication and without a user input for playing the shared data from a user of a computing device including the memory.

In Example 35, the subject matter of Examples 29-34 includes, wherein the request to download the shared data is received from a server associated with the conference.

Example 36 is a non-transitory computer-readable medium storing instructions operable to cause one or more processors to perform operations comprising: receiving a request to download shared data; initiating downloading of the shared data to a memory in response to the request; receiving an indication that the shared data is being presented in a conference; and playing the shared data from the memory if the downloading of the shared data meets a predefined requirement.

In Example 37, the subject matter of Example 36 includes, the operations further comprising: streaming the shared data via the conference if the downloading of the shared data does not meet the predefined requirement, wherein the predefined requirement comprises the shared data being fully downloaded or downloading at a sufficient speed for uninterrupted playback.

In Example 38, the subject matter of Examples 36-37 includes, wherein the shared data comprises a video file, the operations further comprising: determining whether the shared data is downloading at a sufficient speed for uninterrupted playback based on a download speed, a size of the shared data, and a proportion of the shared data that is already downloaded.

In Example 39, the subject matter of Examples 36-38 includes, wherein the shared data comprises multiple files to be presented at different times during the conference, wherein the multiple files are downloaded based on an order specified in the request to download the shared data.

In Example 40, the subject matter of Examples 36-39 includes, the operations further comprising: providing a download status of the shared data.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   providing, by a presenter device connected to a conference, shared data to one or more destination devices connected to the conference;

receiving, by the presenter device, a representation of a download progress of the shared data at the one or more destination devices;

predicting, by the presenter device, a download completion time when at least a threshold number of the one or more destination devices are predicted to have completed downloading the shared data; and prompting a user of the presenter device to select a presentation time of the shared data via a graphical user interface that displays the download completion time in conjunction with causing display, at the presenter device, of the download progress.

2. The method of claim 1, wherein the user of the presenter device is prompted, during the conference and via the graphical user interface, to set the presentation time to a time when a predefined percentage of the one or more destination devices is predicted to have downloaded the shared data.

3. The method of claim 1, wherein the representation of the download progress comprises a number or a proportion of the one or more destination devices that completed downloading at least a predefined portion of the shared data.

4. The method of claim 1, wherein the representation of the download progress comprises an indication of whether a destination device of the one or more destination devices completed downloading the shared data.

5. The method of claim 1, further comprising:

streaming, via the conference at the presentation time, the shared data to at least one of the one or more destination devices that did not complete downloading the shared data.

6. The method of claim 1, wherein the download completion time is a first download completion time and the threshold number of the one or more destination devices is a first threshold number of the one or more destination devices, the method further comprising:

predicting a second download completion time when at least a second threshold number of the one or more destination devices are predicted to have completed downloading the shared data, wherein the graphical user interface displays the first download completion time and the second download completion time.

7. The method of claim 1, wherein the shared data is provided by the presenter device during the conference.

8. The method of claim 1, wherein the shared data is provided by the presenter device before the conference.

9. A non-transitory computer-readable medium storing instructions operable to cause one or more processors to perform operations comprising:

providing, by a presenter device connected to a conference, shared data to one or more destination devices connected to the conference;

receiving, by the presenter device, a representation of a download progress of the shared data at the one or more destination devices;

predicting, by the presenter device, a download completion time when at least a threshold number of the one or more destination devices are predicted to have completed downloading the shared data; and prompting a user of the presenter device to select a presentation time of the shared data via a graphical user interface that displays the download completion time in conjunction with causing display, at the presenter device, of the download progress.

10. The non-transitory computer-readable medium of claim 9, wherein the user of the presenter device is prompted, via the graphical user interface, to set the presentation time to a time when a predefined percentage of the one or more destination devices is predicted to have downloaded the shared data.

11. The non-transitory computer-readable medium of claim 9, wherein the representation of the download progress comprises a number of the one or more destination devices that completed downloading at least a predefined portion of the shared data.

12. The non-transitory computer-readable medium of claim 9, wherein the representation of the download progress comprises an indication of whether a destination device of the one or more destination devices completed downloading the shared data.

13. The non-transitory computer-readable medium of claim 9, the operations further comprising:

streaming, via the conference at the presentation time, the shared data to at least one of the one or more destination devices that did not complete downloading the shared data.

14. The non-transitory computer-readable medium of claim 9, wherein the download completion time is a first download completion time and the threshold number of the one or more destination devices is a first threshold number of the one or more destination devices, the operations further comprising:

predicting a second download completion time when at least a second threshold number of the one or more destination devices are predicted to have completed downloading the shared data, wherein the graphical user interface displays the first download completion time and the second download completion time.

15. A system comprising:

one or more processors; and one or more memories storing instructions which, when executed by the one or more processors, cause the one or more processors to:

provide, by a presenter device connected to a conference, shared data to one or more destination devices connected to the conference;

receive, by the presenter device, a representation of a download progress of the shared data at the one or more destination devices;

predict, by the presenter device, a download completion time when at least a threshold number of the one or more destination devices are predicted to have completed downloading the shared data; and prompt a user of the presenter device to select a presentation time of the shared data via a graphical user interface that displays the download completion time in conjunction with causing display, at the presenter device, of the download progress.

16. The system of claim 15, wherein the user of the presenter device is prompted, during the conference, to set the presentation time to a time when a predefined percentage of the one or more destination devices is predicted to have downloaded the shared data.

17. The system of claim 15, wherein the representation of the download progress comprises a proportion of the one or more destination devices that completed downloading at least a predefined portion of the shared data.

18. The system of claim 15, wherein the representation of the download progress comprises an indication of whether a specific destination device of the one or more destination devices completed downloading the shared data.

19. The system of claim 15, the one or more memories further storing instructions which, when executed by the one or more processors, cause the one or more processors to:

stream, via the conference at the presentation time, the shared data to at least one of the one or more destination devices that did not complete downloading the shared data.

20. The system of claim 15, wherein the download completion time is a first download completion time and the threshold number of the one or more destination devices is a first threshold number of the one or more destination devices, the one or more memories further storing instructions which, when executed by the one or more processors, cause the one or more processors to:

predict a second download completion time when at least a second threshold number of the one or more destination devices are predicted to have completed downloading the shared data, wherein the graphical user interface displays the first download completion time and the second download completion time.

\* \* \* \* \*